United States Patent [19]

Harris

[11] Patent Number: 5,200,979
[45] Date of Patent: Apr. 6, 1993

[54] HIGH SPEED TELECOMMUNICATION SYSTEM USING A NOVEL LINE CODE

[75] Inventor: Gwendolyn K. Harris, Ottawa, Canada

[73] Assignee: Northern Telecom Limited, Montreal, Canada

[21] Appl. No.: 710,995

[22] Filed: Jun. 6, 1991

[51] Int. Cl.[5] .................... H04L 25/34; H04L 25/45
[52] U.S. Cl. ........................................ 375/19; 341/58
[58] Field of Search ................... 375/19, 17; 341/58, 341/52, 68; 370/82; 178/69 D; 371/56

[56] References Cited

U.S. PATENT DOCUMENTS

| 4,408,189 | 10/1983 | Betts et al. | 375/17 X |
| 4,528,550 | 7/1985 | Graves | 375/17 X |
| 4,626,826 | 12/1986 | Fukuda et al. | 375/19 X |
| 4,682,334 | 7/1986 | Le Mouel et al. | 375/19 X |
| 5,022,051 | 6/1991 | Crandall et al. | 375/19 |

FOREIGN PATENT DOCUMENTS 2232858 12/1990 United Kingdom .................. 375/19

OTHER PUBLICATIONS

Publication: "A Chipset for Gigabit Rate Data Communication" by R. C. Walker et al., Proceedings of the 1989 Bipolar Circuits & Technology Meeting, IEEE, Sep. 18-19, 1989, pp. 288-290.

Primary Examiner—Curtis Kuntz
Assistant Examiner—Tesfaldet Bocure
Attorney, Agent, or Firm—Yoshiharu Toyooka

[57] ABSTRACT

High speed telecommunications systems are disclosed which use a novel line coding scheme for better performance. The line code according to the scheme be can used to produce a block code of arbitrary length. It bounds the minimum number of transitions in a block, and the dc balance of the code. The overhead required is 2 bits if framing is not included and 3 bits if it is. A lookup table is not required to implement the code, thus it remains efficient for longer block lengths. The algorithm required to encode and decode the data can be implemented in serial at the transmission rate or in parallel at the block rate. The coding scheme results in a significant reduction in hardware components of the communication system.

18 Claims, 8 Drawing Sheets

Complexity

17 bit register
(17 F/F)

(8 inverters)

16 input comparators

Controlled inverter
(18 XOR)

18 bit register
(18 F/F)

(18 XOR, 18 F/F)

18 bit register
(18 F/F)

Adder Tree
(≈320 gates)

5 bit signed addition
(≈15 gates, 5 XOR and
5 F/F)

(XOR, Inverter,
1 bit adder w. carry)

Controlled Inverter
(18 XOR)

19 bit register
(19 F/F)

HIGH SPEED TELECOMMUNICATION SYSTEM USING A NOVEL LINE CODE

FIELD OF THE INVENTION

The present invention relates generally to a high speed digital telecommunication technique. In particular, it is directed to a method of and an apparatus for communicating serially at high speed digital data signals which are block-coded in a new and more efficient format for a good statistically balanced transmission.

BACKGROUND OF THE INVENTION

In modern data telecommunication, raw data is modulated (encoded, or simply coded) into PCM signals and then are transmitted to a destination terminal or terminals. The received PCM signals are then demodulated (decoded) into the identical raw data at the destination. There are numerous encoding (coding) and decoding schemes (also called formats). A specific coding scheme (or format) is chosen for a particular application, based upon required performance criteria, cost effectiveness, the type of transmission path to be used, etc. It is therefore very common that the raw data is coded and decoded many times in different formats as they travel through the communication path from one level to another before they reach the destination.

The present invention relates to a new line code, the term generally used for a data transmission coding scheme and format, which finds particular application in high speed serial data links, optical and non-optical. Line coding is used to create favourable statistical properties in a transmitted signal. In addition to essential requirements of being transparent and uniquely decodable etc., a line code must exhibit some other features. Three important qualities are its dc balance, transition density (and run bound), and bandwidth requirements. An additional practical requirement of the code is that it be simple to implement, at high speed where memory lookup implementations are impractical.

The dc balance (or dc component) is the shift of the transmitted center level created by the average time the signal is on to the time it is off. With code format, it is the pattern of the positive pulse duration and timing to that of the negative pulse or in most instances, it is the algebraic difference between the number of logical ones and the number of logical zeros. Any drift of the transmitted signal from the center baseline level will create a dc imbalance and affects the performance of the communication operation. The line code must therefore have a minimum or zero dc balance.

Decoding the data in the reciever can only be achieved if the clock timing of the receiver is fully synchronized with that of the transmitter. Since the only connection betwwen the receiver and transmitter is via a data link, the timing points must be recovered out of the received signal stream. That is, each symbol level transition, or in effect the crossing of the zero level, will represent a clock timing. This will call for code formats with as many transitions as possible, with the ideal situation of possessing the characteristics of one transition for each coded bit in the stream. Code formats, which provide enough transitions from which the receiver can recover both the clock timing and the data, are referred to as self-clocking codes. Coded data telecommunication also often requires framing of bits and usually a frame bit inserted at regular intervals in a specific pattern indicates the boundary of a frame.

Available bandwidth has an upper limit, in which transmission rates that exceed will cause intersymbol interference. Therefore if the transmission rate out of the decoder is higher than the link rate, there might be a need for a reduction in the data rate produced by the source before the signal can be transmitted over the link. As mentioned earlier, the data is converted from one code into another as it travels through the transmission path. It is quite common in practice to add extra bits into a code word, when the code is converted, for the purpose of ensuring more control functions, more error checking etc. Therefore the bandwidth consideration becomes important.

Among many coding schemes in use today for high speed serial data links, some of the most popular are scrambling, Manchester, Miller, and nBmB (e.g. FDDI (Fiber Distributed Data Interface) 4B5B code).

Scrambling improves the statistics of transition density and dc balance without increasing the required bandwidth. It cannot, however, bound the worst case of these properties. The Manchester code ensures a transition for every bit and perfect dc balance. However, it requires twice the transmission bandwidth (prior to framing overhead). The Miller code requires only a modest increase in the transmission bandwidth (prior to framing overhead), but requires a double frequency clock to recover the data. The FDDI 4B5B block code has a 20% increase in bandwidth and it does bound the dc balance and transition density. It does not include framing allocation. Many other coding schemes have been devised to improve transmission characteristics. It should also be noted that many schemes, including some mentioned above, require framing bits as an integral part so that any further modification such as the length of a block etc. may not be possible.

Other codes using inversion of blocks to preserve dc balance are described in U.S. Pat. Nos. 4,408,189, issued on Oct. 4, 1983 to Betts et al, and 4,528,550, issued on Jul. 9, 1985 to Graves.

OBJECTS OF THE INVENTION

It is therefore an object of the present invention to provide a method of and an apparatus for a high speed digital data telecommunication using a more efficient coding scheme.

It is another object of the present invention to provide a method of and an apparatus for coding digital data signals into a format which realizes a more efficient transmission.

It is yet another object of the present invention to provide a method of and an apparatus for coding digital data signals into a block coded format of any arbitrary bit length which realizes a more efficient transmission.

It is still a further object of the present invention to provide a method of and an apparatus for coding digital data signals into a block coded format which has better statistical characteristics, yet can carry information for framing and other control functions.

SUMMARY OF THE INVENTION

Briefly stated, the present invention is directed to a high speed digital telecommunication system having an apparatus for serially transmitting digital data signals in blocks of coded bits. The apparatus includes encoder means for encoding in each block, data bits B (B0, B1, . . . , Bn-2,Bn-1) of a preselected length representing data words, a transition bit T and a dc balance bit D. The transition bit T indicates a bit inversion operation performed in response to the number of bits among the data bits and the transition bit of the block that are at one of the binary states. The dc balance bit D shows a bit inversion operation performed in response to the dc balance of all the bits in a block with respect to a previously accumulated system balance. It further includes dc balance means for updating the accumulated system balance by algebraically summing the dc balance of all the bits in the block and the previously accumulated system balance. There is also provided in the apparatus, driver means for serially transmitting each frame successively.

The present invention is directed also to a method of serially transmitting digital data signals in blocks of coded bits, which comprises steps of providing in each block, data bits B (B0, B1, ..., Bn-2, Bn-1) of a preselected length representing data words, a transition bit T and a dc balance bit D, where the transition bit T indicates a bit inversion operation performed in response to the number of bits in the data bits and the transition bit of the block that is one of the binary states and the dc balance bit D indicates a bit inversion operation performed in response to the dc balance of all the bits in a block with respect to a previously accumulated system balance. The method further includes steps of calculating the dc balance of each block and updating the accumulated system balance by algebraically summing the dc balance of the block and the previously accumulated system balance. The method also includes steps for repeating the above procedures for each of the successive blocks and serially transmitting each block successively.

BRIEF DESCRIPTION OF THE DRAWINGS

For a more complete understanding of the present invention and for further objects and advantages thereof, references may now be made to the following description taken in conjunction with the accompanying drawings in which.

DETAILED DESCRIPTION OF THE PREFERRED EMBODIMENTS

Figure 1:
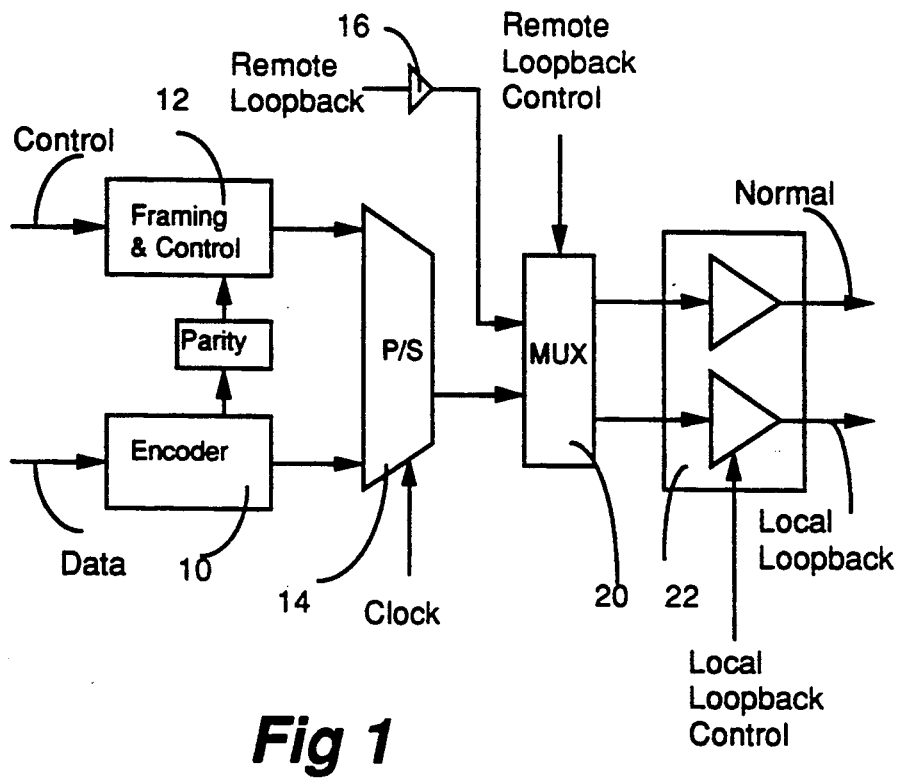
FIG. 1 is a schematic diagram of the transmitter, according to one embodiment of the invention.
Figure 2:
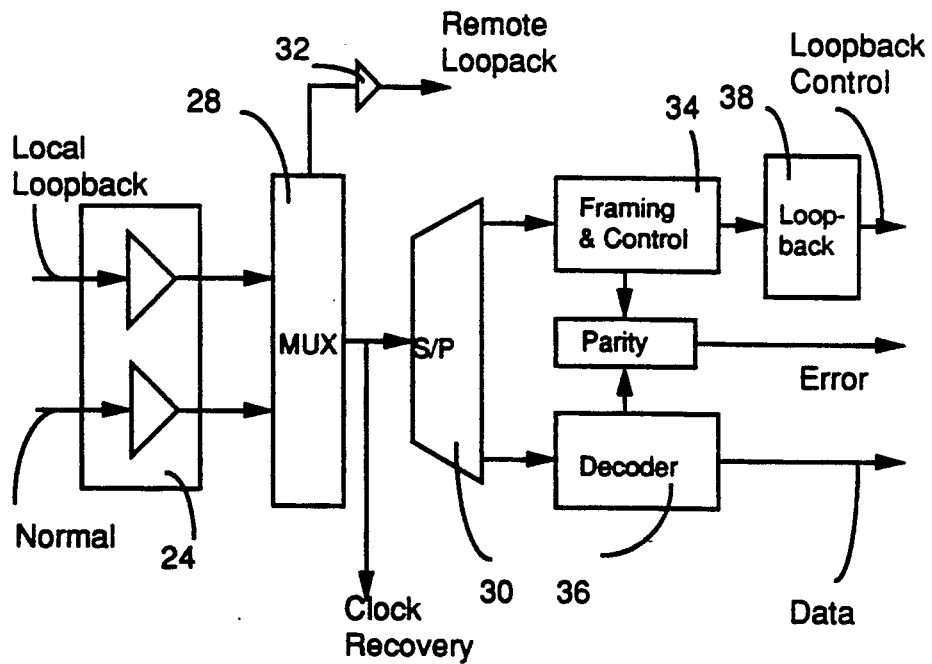
FIG. 2 is a schematic diagram of the receiver, according to one embodiment of the invention.

FIGS. 1 and 2 are brief functional block diagrams of a transmitter and a receiver, respectively, which form a high speed data telecommunication system. The figures show only parts concerning encoding/decoding multiplex/demultiplexing and framing control etc., and are only small portions of functions which are carried out in a respective semiconductor chip. Therefore in FIG. 1, there are illustrated an encoder 10 and a framing and control circuit 12, both of which are connected to a serializer 14. The encoder 10 receives a parallel data signal and sends an encoded data signal to the seralizer 14. At the same time, a parity check signal is sent to the framing and control circuit 12. The framing and control circuit 12 includes a frame pattern generator which generates frame bits in a distinct frame pattern. The circuit obtains control signals and mixes them with the generated frame bits. The mixed frame bits and control signals are sent to the serializer 14 which converts to a serial bit stream. A multiplexer 20 multiplexes various serial bit streams and a driver circuit 22 transmits multiplexed serial bit streams to a receiver. The driver circuit 22 includes amplifiers for a normal output and loopback output, the latter of which is used for system testing of the communication paths. The transmitter also includes a remote loopback circuit 16 to handle a remote loopback input for testing.

FIG. 2 shows a receiver in brief diagrams. The serial bit streams, normal input and loopback input, from the transmitter are received and processed at a line driver 24. After having been demultiplexed at a demultiplexer 28, a bit stream is converted to a parallel signal at a deserializer 30. The deserializer 30 separates frame and control bits and data bits, both of which are respectively sent to a framing and control circuit 34 and a decoder 36. A loopback means 38 produces loopback control signals. An error signal is produced at a parity check circuit which compares signals from the framing and control circuit and the decoder. A remote loopback circuit 32 handles a remote loopback output for testing.

Figure 3:
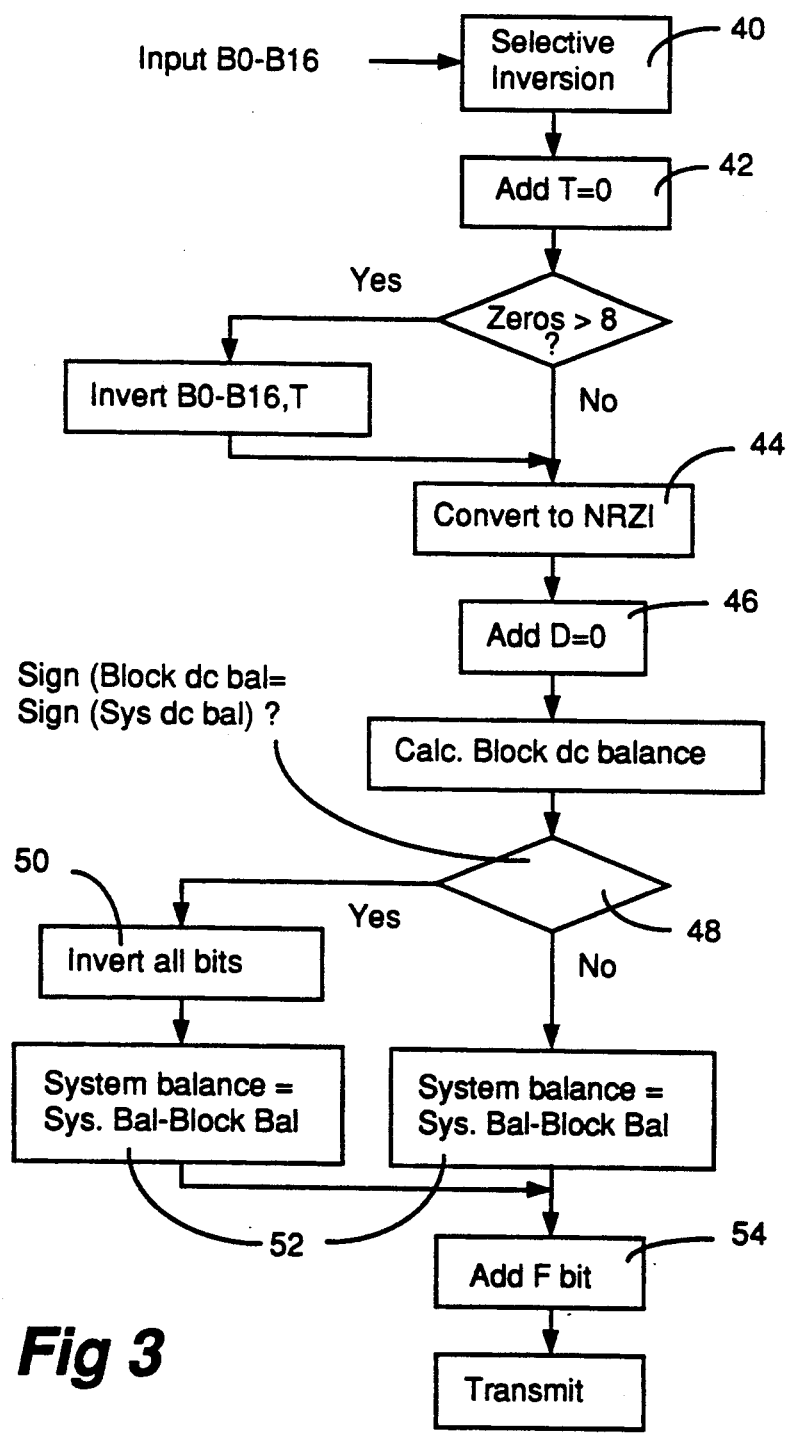
FIGS. 3 and 4 are a flow chart and a block diagram respectively of the encoder, according to one embodiment of the invention.
Figure 4:
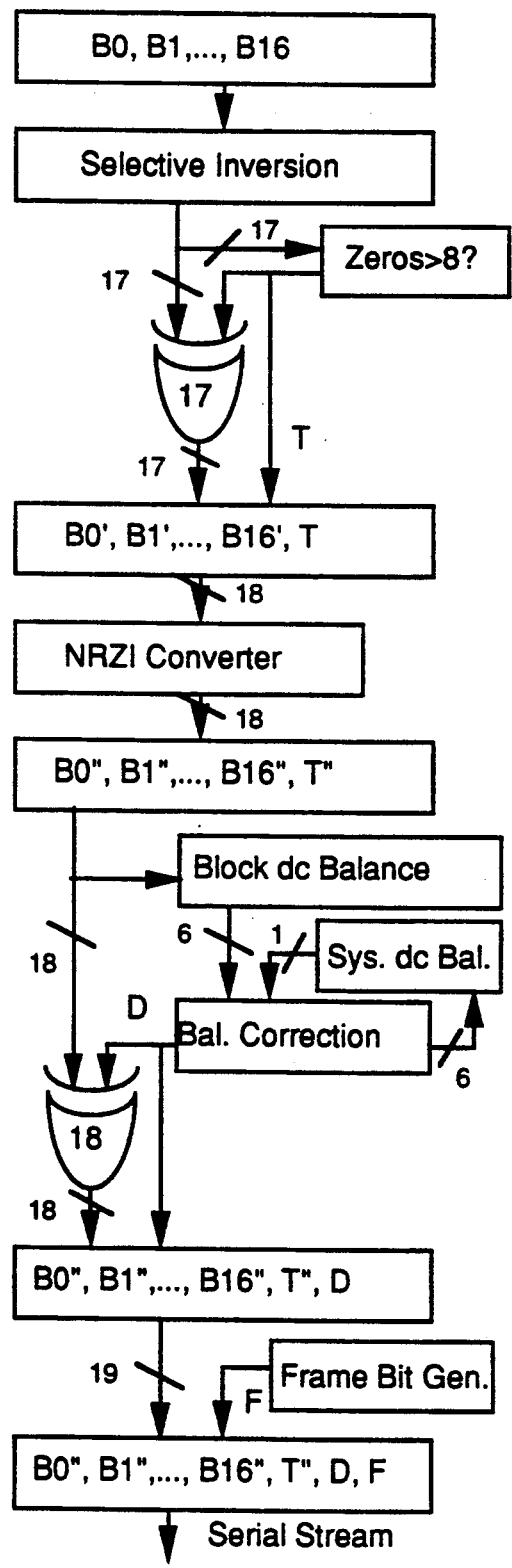

FIGS. 3 and 4 show a flow chart and a circuit diagram, respectively, of the encoder illustrated in FIG. 1. It should be noted that the following description deals mainly with a specific embodiment of a line coding scheme of the present invention. The embodiment finds its applications chiefly in high speed telecommunication. However, similar or same line coding schemes can be used in various areas of data communications.

The important criteria for a code to be used in high speed telecommunication are:
 data transparency;
 control codes;
 robust framing, not requiring a sychronization sequence;
 bounded dc balance to permit ac coupling;
 bounded run length and high transition density for clock recovery; and
 two level code.

In one of the preferred embodiments which will be described below, the code is based on 20 bit long blocks. The coding does not carry across block boundaries (except to maintain dc balance). The 20 bits are assigned in the following manner:
 17 data bits (B0-B16)
 1 bit for increasing transitions (T)
 1 bit for ensuring dc balance (D)
 1 bit for framing and control codes (F).

The description below follows the flow chart of FIG. 3. The steps described are not always carried out exclusively at the boxes indicated but may involve other boxes numbered or unnumbered.

Step 1 (at box 40): Apply inversion to bits B3, B6, B7, B9, B11, B12, B13, B14, B16. This step is included to distribute the energy in the data spectrum for a static pattern of all zero data or all ones data, and thus to reduce EMI (Electro-Magnetic Interference). There exists a input pattern that will produce a square wave line pattern, however it is unlikely to be maintained for any significant length of time. This step can be eliminated for a circumstance where EMI is not a problem or other bits may be selected for inversion for other circumstances.

Step 2 (at box 42): A transition bit set to zero (T=0) is added to the B16 side of the block. The block is checked to determine how many bits are zero. If nine or more are zero, then all bits are inverted. Thus the transition bit is set if the inversion took place, and is zero otherwise. Output: [B0′, B1′, . . . , B16′, T]

Step 3 (at box 44): The 18 bits are converted into Non-Return-to-Zero-Invert-on-Ones (NRZI). This operation turns the ones obtained in the previous step into transitions. This operation begins at T and proceeds across to B0′. The level preceding T is assumed to have been a zero (therefore T=T″). Output: [B0″, B1″, . . . , B16″, T″]

Step 4 (at box 46): A dc balance bit set to zero (D=0) is added to the T bit side of the block. The block balance of the resulting 19 bit code is calculated (number of ones-number of zeros). Output: [B0″, B1″, . . . , B16″, T″, D]

Step 5 (at box 48): The dc block balance is compared to the accumulated system balance. The bits are inverted if the signs are the same. The purpose of this operation is to reduce the absolute value of the accumulated balance. It should be noted that the balance of the block can never be zero, but the system balance can. When this is the case, blocks with a positive balance are inverted at box 50, and those with a negative balance are not. After this operation, the D bit is set if an inversion occurred, and is zero otherwise. Output [B0*, B1*, . . . , B16*, T*, D]

Step 6 (at boxes 52): The calculated dc balance is added to the accumulated system balance if no inversion occurred and subtracted if it did (algebraic summation). (The system balance is set to zero on power up or reset.)

Step 7 (at box 54): The frame bit is added to the D bit side of the block. The framing sequence is produced by a recursive 4 bit shift register, which will be shown below. This produces a sequence which is 15 bits long. Three of these 15 bits are reserved to carry control information. These three bits are identified by decoding 3 unique states of the shift register. Output [B0*, B1*, . . ., B16*, T*, D, F]

Step 8: The block is transmitted serially. The F bit is transmitted first and B0 last. It should be noted that the effect of the F bit on the dc balance is ignored.

Example:

| | | |
|---|---|---|
| System dc Balance = 6 | | |
| Next frame bit = 1 | | |
| Input 17 Data bits | 00110000011111010 | |
| Step 1 | 00100011001000111 | Selective inversion |
| Step 2 | 11011100110111000 1 | Inversion |
| Step 3 | 101101000100101111 | |
| Step 4 | 1011010001001011110 | Add D = 0 |
| | | (Block Balance = 1) |
| Step 5 | 0100101110110100001 | Inversion |
| Step 6 | System Balance = 5 | |

| | | |
|---|---|---|
| -continued | | |
| System dc Balance = 6 | | |
| Next frame bit = 1 | | |
| Step 7 | 01001011101101000011 | Add F = 1 or 0 |

FIG. 4 is a block diagram of the encoder, and further includes the complexity which indicates the amount of hardware which may be required to accomplish these functions. The complexity shown is a set of estimated values and the actual figures may vary not only in numbers but breakdowns of stages.

Figure 5:
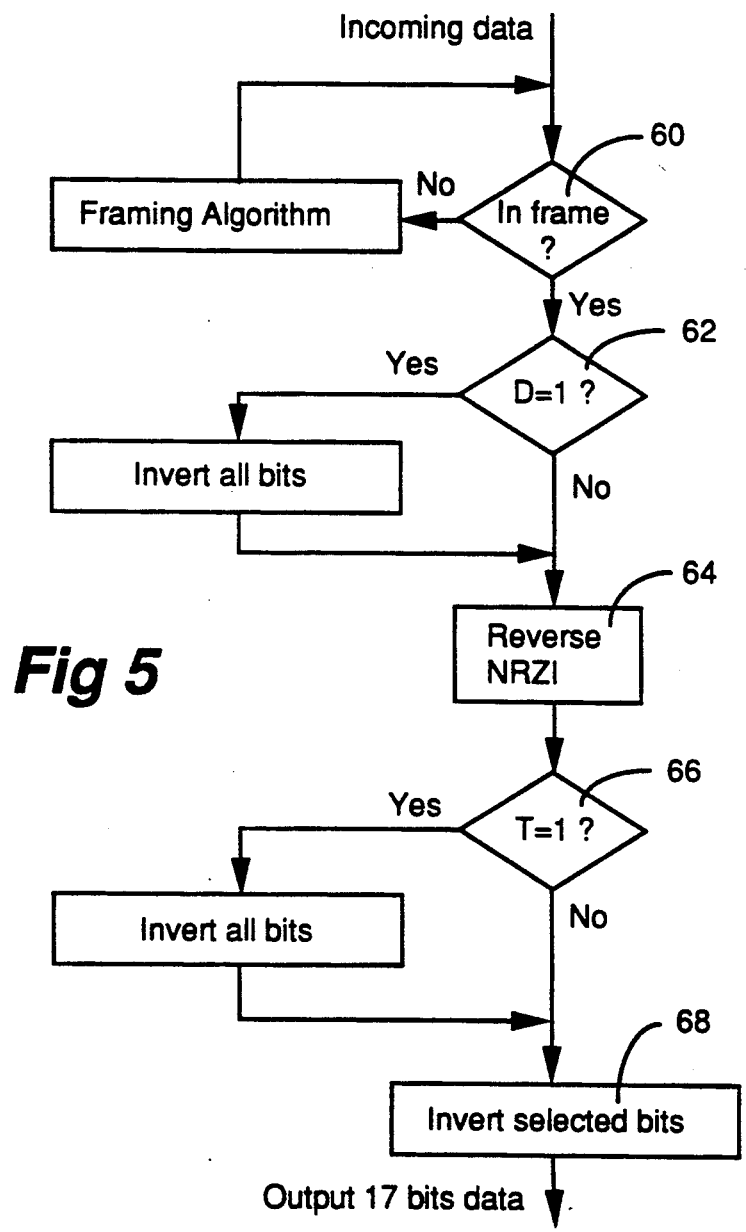
FIGS. 5 and 6 are a flow chart and a block diagram respectively of the decoder, according to one embodiment of the invention.
Figure 6:
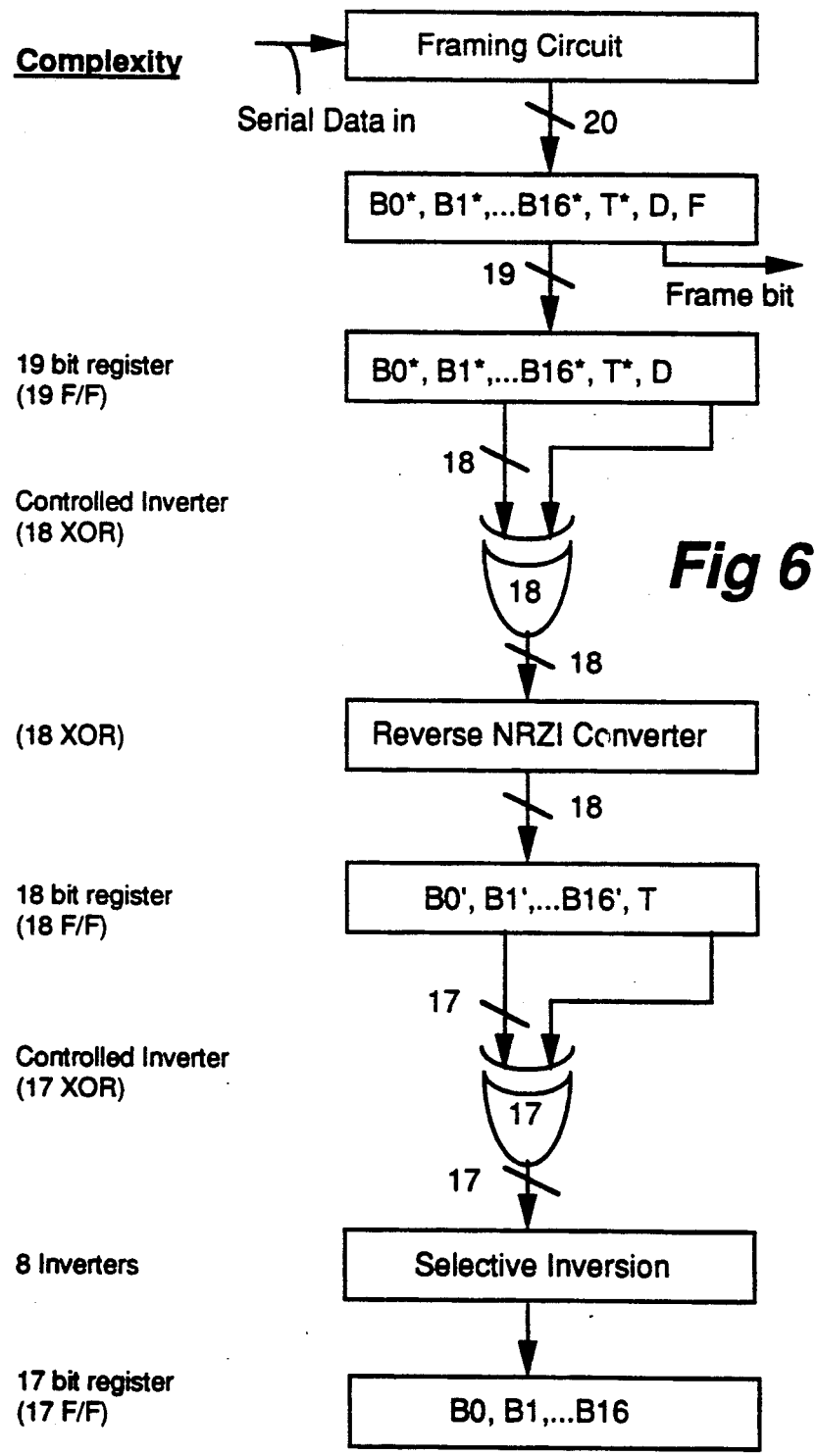

As in FIGS. 3 and 4, the decoder functions are illustrated in FIGS. 5 and 6 as a flow chart and a circuit diagram respectively. The description below follows the flow chart of FIG. 5. The incoming serial stream is [B0*, B1*, . . . , B16*, T*, D, F].

Step 1 (at box 60): Align to frame and remove frame bit. Output: [B0*, B1*, . . . , B16*, T*, D]

Step 2 (at box 62): Invert if D=1 and remove D bit. Output: [B0″, B1″, . . . , B16″, T″]

Step 3 (at box 64): Reverse the NRZI. Output: [B0′, B1′, . . . , B16′, T′]

Step 4 (at box 66): Invert if T=1 and remove T bit. Output: [B0, B1, . . . , B16] (16 data bits and 1 cell frame pulse bit)

Step 5 (at box 68): Apply selective inversion to bits (B3, B6, B7, B9, B11, B12, B13, B14, B16)

Step 6: Output parallel data.

Example:

| | |
|---|---|
| System dc Balance = 6 | |
| Incoming serial bits | 01001011101101000011 |
| Step 1 | 0100101110110100001 |
| Step 2 | 101101000100101111 |
| Step 3 | 110111001101110001 |
| Step 4 | 00100011001000111 |
| Step 5 | 00110000011111010 |

FIG. 6 includes a block diagram of the decoder and the complexity.

Figure 7:
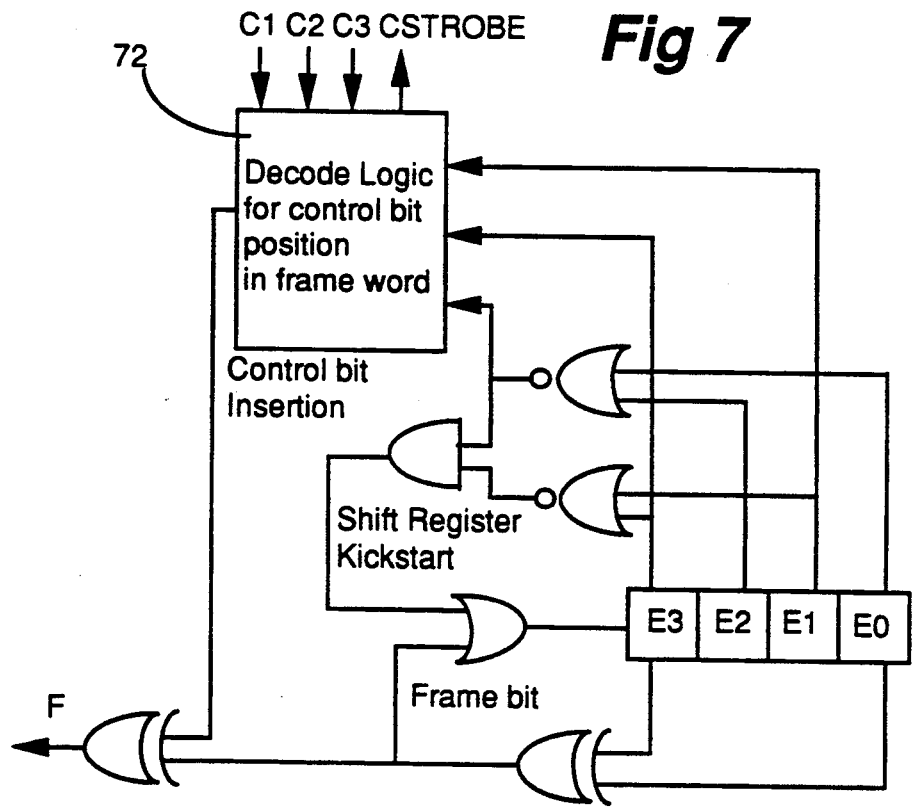
FIG. 7 is a schematic diagram of a framing and control circuit of the invention.
Figure 8:
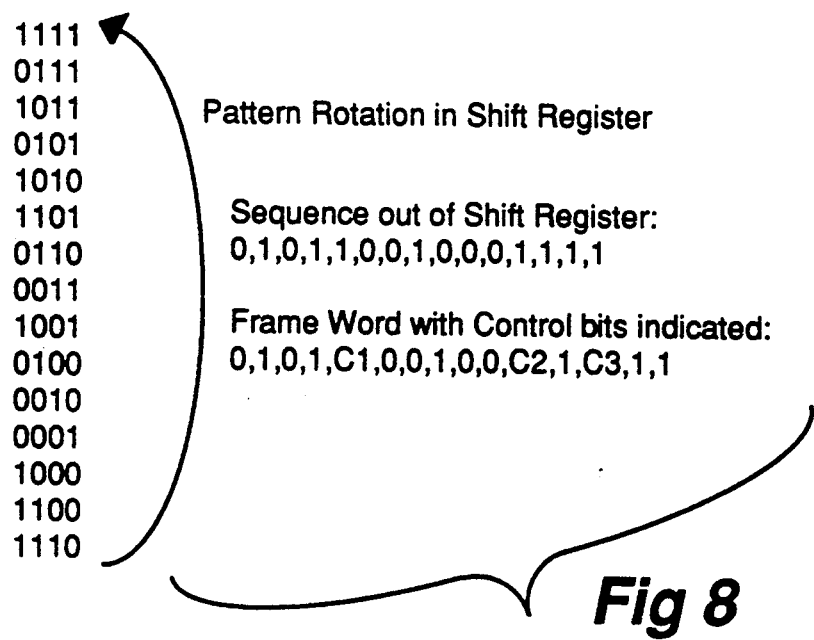
FIG. 8 is a table showing one example of a pseudorandom pattern of the frame bits.

The frame pattern is a self synchronizing pseudo-random pattern of length 15. Three of the bits will be overwritten to carry control codes. The frame pattern creation circuit is shown in FIG. 7. In the figure, a set of four shift registers E0, E1, E2 and E3 are used to generate the pseudo-random bit pattern for framing. There is also shown in the figure a control bit insertion circuit 72 which receives three control logic bits C1, C2, C3 for modifying bits in predetermined positions within the framing pattern. In this embodiment, the control logic bits are used for the control of certain control functions in the data communication, such as equipment testings (loopback testings) in addition to the normal mission. The pseudo-random pattern of 15 bits long generated by four shift registers is shown in FIG. 8.

Three control logic bit positions occur when E2 and E0 of the shift register are zero. The remaining two bits determine which control bit is indicated. If all the bits are zero, a one is shifted into E3 of the shift register to kickstart the framing sequence. Thus:

| State | E3 | E2 | E1 | E0 | |
|---|---|---|---|---|---|
| C1 | 0 | 0 | 1 | 0 | Control Logic Bit |
| C2 | 1 | 0 | 0 | 0 | Control Logic Bit |
| C3 | 1 | 0 | 1 | 0 | Control Logic Bit |

| State | E3 | E2 | E1 | E0 | |
|---|---|---|---|---|---|
| Kick Start | 0 | 0 | 0 | 0 | Disallowed State |

A control logic bit is asserted by inverting the frame bit that would normally occur in that position. Control logic bits are not acted upon until framing is established. A strobe signal will be provided to indicate when the externally accessed control logic bits may be changed. It will occur when 1111 is held in the shift register.

In the present embodiment, combinations of C1 and C2 are used for mission for transmitting data, and for testing the system by looping back test data through the transmitter or receiver. C3 is dedicated to link error monitoring.

The four possible combinations of C1 and C2 are assigned in the following table

| C2 | C1 | Control Code |
|---|---|---|
| 0 | 0 | Mission (Normal Mode) |
| 0 | 1 | Mission (Normal Mode) |
| 1 | 0 | Repeater Loopback Control Code |
| 1 | 1 | Remote Loopback Control Code |

In the mission mode the parallel data is encoded, the frame and control logic bits are added, and then converted to serial format using an internally generated clock. The loopback modes are used for system testing of the communication paths. In local loopback mode the serial data is sent through the local mate receiver to test its functionality. The remote loopback mode tests the serial transmission medium used in a bidirectional link.

Figure 9:
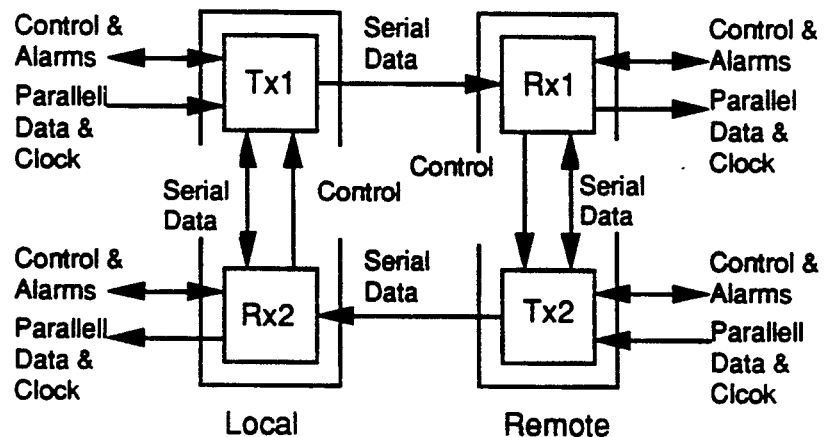
FIG. 9 illustrates a bi-directional link using pairs of transmitters and receivers.
Figure 10:
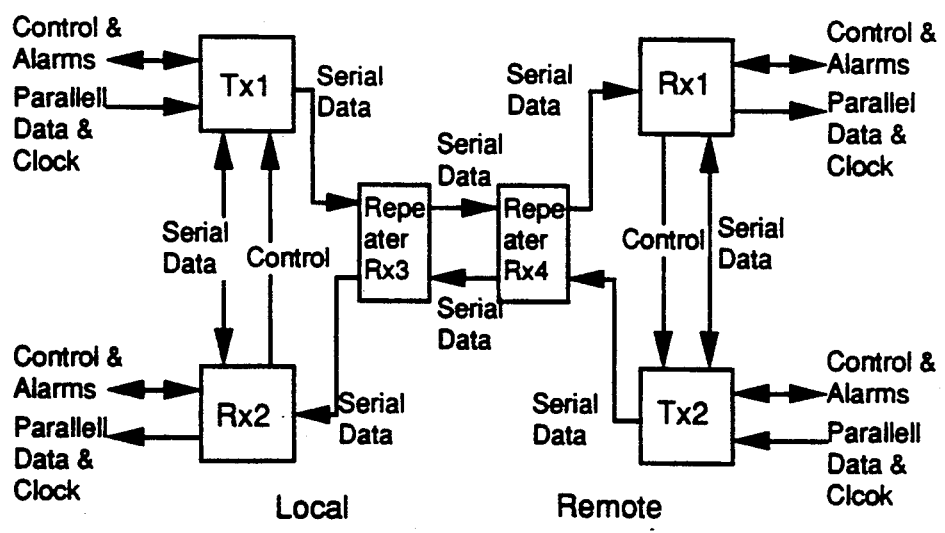
FIG. 10 illustrates a bi-directional link using transmitters, receivers and repeaters.

FIG. 9 depicts a configuration of a bi-directional link using pairs of transmitters and receivers. A transmitter Tx1 and receiver Rx2 are a local set located at one location, and a transmitter Tx2 and receiver Rx1 are a remote set located at another location. Serial data bits and other control or frame bits are sent in directions shown therein. A selection of control signals determines the mode of operations and selects the proper paths for such operations. FIG. 10 on the other hand illustrates a configuration of a bi-directional link using pairs of transmitters and receivers in addition to repeaters.

Referring back to FIG. 7, the control logic bit C3 in the framing sequence carries a parity bit that covers the data after encoding (before decoding). It does not cover the frame bit. As the parity is inserted only once in a frame it covers 19*15 bits. The control logic bit strobe signal is used to update the parity value.

The frame bit in the code according to the present invention does not interact with the rest of the block. This allows greater freedom in choosing the frame pattern and also the line interface part of the system design remains completely independent of data structure. Any frame length or pattern can be chosen to fit the needs of the communication system. Also, in the case where the data has been previously encoded with framing, by choosing a frame length that is not a fraction of the previous frames, the possibility of mimicking the frame pattern by static data is virtually eliminated. This method has allowed the use of a circuit which generates efficient pseudo-random codes for framing patterns.

The length of the frame pattern and the framing state machine combine to define the average reframe and false frame times and the probability of static data imitating the frame pattern. By using a two-state framing algorithm, the time to loss of frame due to random errors can be significantly increased. This algorithm requires two consecutive frame words to have errors before a frame is considered lost. It also requires two consecutive correct frame words before a frame is found. This has negligible effect on the reframe time.

Using this algorithm the reframe time (based on average maintenance time for false frame) is less than 1μ second for frame pattern length from 4 to 32 bits. At the shortest frame pattern the time is dominated by false framing, at the longest by the time taken to load the pattern. The maintenance time assuming a bit error rate of $10^{-14}$ is essentially forever. Thus, within the range of 4 to 32 bits the frame length is not critical.

Figure 11:
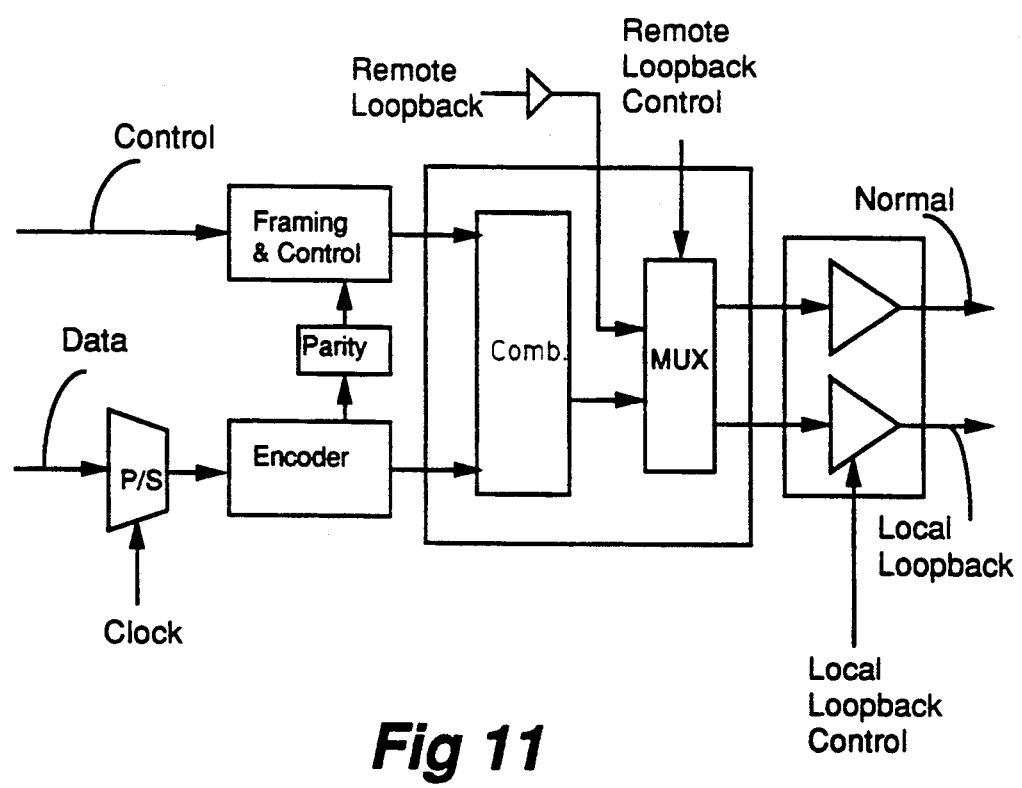
FIG. 11 is a schematic diagram of the transmitter including a serial encoder according to another embodiment of the invention.

While FIGS. 1 and 2 show encoding and decoding operations on parallel data streams at the block rate, it is of course possible to perform such operations on serial data streams at the transmission rate. Therefore as shown in FIG. 11, a transmitter includes a parallel-to-serial converter which is located ahead of an encoder for the serial operations. A combiner combines the frame and encoded serial bits. A receiver can be arranged in a similar fashion for reverse operations.

The properties of the coding scheme according to the present invention have been analyzed by a combination of analytical methods, exhaustive code combinations, and random data simulations. The last two methods involved computer analysis due to the number of possible data combinations in 17 bits of data ($131 \times 10^3$). The resulting statistics on the run bound and the dc balance appear below.

Comparisons are made with the HP (Hewlet-Packard TM) code and the FDDI 4B5B code. These codes are the most similar to the code according to the present invention. The HP code is made up of four blocks of 4B5B and can be considered as 16B20B or modified 4B5B. The HP code is described in detail in the Proceedings of the 1989 Bipolar Circuits and Technology Meeting on Sep. 18-19, 1989, in an article entitled "A Chipset for Gigabit Rate Data Communication" by Walker et al, pp. 288-290.

Overhead

Of the 20 bits in a code block, there are 3 bits of overhead which provide improvement in the transmission characteristics, control codes and framing for the link. This corresponds to 15% overhead. The HP code uses 4 bits out of a 20 bit block to provide these features (20% overhead). The 4B5B encoding uses 20% overhead to provide the data transmission characteristics. Additional bandwidth would be needed to provide framing and control codes.

Transition Density and Run Bound

The code according to the present invention has a minimum of 9 transitions in each 20 bit block. This gives a minimum transition density of 44% and a maximum run bound of 19. This run bound can only occur across block boundaries. It occurs very infrequently and is separated by at least 18 transitions.

The HP code has a minimum transition density of 5%, as only one transition is guaranteed in the 20 bit block. The run is 20 bits. This occurs only within a block, but can occur in adjacent blocks as many times as the data remains unchanged. The 4B5B has a minimum transition density of 40% and a run bound of 3 bits.

DC Balance

The accumulated dc imbalance cannot exceed +8, −9 bits using the code of the present invention (measured at block boundaries and not including the frame bit). Withing blocks the imbalance can reach +13 or −14 bits. The HP code bounds the dc imbalance to ±19 bits at block boundaries, and ±28 within block. In 4B5B code, each code has a balance of ±10%. Therefore, the code can have a dc drift of up to ±10% at all frequencies.

In an ac coupled system, dc imbalance in the transmitted signal causes the mid height of the received pulses to be shifted from set sampling point. This causes eye closure.

In a code (like the code according to the present invention) where both system dc imbalance and run length are bounded, the longer of the two bounds determines the maximum eye closure due to ac coupling. Thus, in this code, it is determined by the rum bound of 20 bits (included framing):

$$\% \text{ Droop} = \frac{R(T)(100)}{\tau}$$

where:
R=Run bound (20 bits)
T=bit period (1 ns)
$\tau$=time constant of ac coupling filter (RC)
Circuit Complexity Comparisons of circuit complexity are difficult to make meaningful unless the same amount of time is spent optimizing each implementation. The HP code can be reasonably estimated as requiring ⅔ the circuitry as the code of the present invention as the HP code only performs ⅔ the operations on the data.

Even though the present code requires more circuitry than the HP code, it is not excessive. A rough estimate in terms of equivalent 2 input gates is 1.6k gates for the encoder, and 1k gates for the decoder. These estimates include the framing circuitry, control circuitry and retiming flip-flops. For Comparison purpose, the alignment buffer in the receiver is estimated at 2k gates.

Error Multiplication

If one bit in this code is corrupted in transport, several bit errors may result after decoding. These errors never span across 16 bit words. Thus, if the data is used on a word basis, the error multiplication effect is important only in the manner in which error detection is encoded into the data itself. It should be noted that parity on a word basis is particularly poor choise as it will miss the majority of single bit errors.

The following table shows the result to the output data of each possible single bit error:

| Bit in Error | Result |
| --- | --- |
| F | No errors in output data, will cause change in Frame or Control Code state machine |
| B | Flips all bits except B16 |
| B1-B16 | Errors in bits Bn and Bn-1 |
| B0 | Errors in bit B0 |

I claim:

1. A high speed digital telecommunication system having an apparatus for serially transmitting digital data signals in blocks of coded bits, said apparatus comprising:
encoder means for encoding each block of bits which include data bits B (B0, B1, . . . , Bn-2, Bn-1) of a preselected length n, n being a positive integer, a transition bit T and a dc balance bit D,
said data bits B representing data words,
said transition bit T indicating a bit inversion operation performed in response to the number of bits among said data bits and said transition bit of said block that are one of the binary states, and
said dc balance bit D indicating a bit inversion operation performed in response to the dc balance of all the bits in said block with respect to a previously accumulated system balance;
system balance means for updating an accumulated system balance by algebraically summing said dc balance of all the bits in each of said blocks and said previously accumulated system balance;
serializer means for arranging all the bits, including said data bits, transition bit T and dc balance bit D in each of successive blocks to a specific order; and
driver means for serially transmitting said each serialized successive blocks.

2. The high speed digital telecommunication system, according to claim 1, wherein said encoder means comprises:
transition means for counting the number of binary ones and setting said transition bit T according to said number; and
dc balance means for calculating the dc balance of said block and generating said dc balance bit D according to the calculation result of the dc balance of said block with reapect to said previously accumulated system balance.

3. The high speed digital telecommunication system, according to claim 2, said apparatus further comprising:
framing means for generating and adding a frame bit F to each block to form a frame, said frame bit F indicating a boundary of said frame and control functions in the data transmission;
said serializer means arranging all the bits in each of successive frames to a specific order; and
said driver means transmitting each frame successively.

4. The high speed digital telecommunication system, according to claim 3, wherein:
said framing means comprising frame pattern generator for generating a plurality of frame bits F in a specific sequence;
control logic means for generating control logic bits C; and
logic bit insertion means for inserting said control logic bits into said specific sequence of said frame bits.

5. The high speed digital telecommunication system, according to claim 4, wherein said specific order is said frame bit F, said dc balance bit D, said transition bit T and said data bits Bn-1, Bn-2, . . . , B1, B0 in this order in the time domain.

6. The high speed digital telecommunication system, according to claim 5, said apparatus further comprising bit inversion means for selectively inverting bits at certain positions wihtin said data bits so that the energy in the data spectrum for a static pattern of all zero data or all one data is distributed to reduce electro-magnetic interference.

7. The high speed digital telecommunication system, according to claim 4, wherein said data bits are parallel data bits and said encoder means encodes said data bits in parallel.

8. The high speed digital telecommunication system, according to claim 5, wherein said data bits are serial data bits and said encoder means encodes said data bits in serial.

9. A method of serially transmitting digital data signals in blocks of coded bits, comprising steps of:
    encoding each block of bits which include data bits B (B0, B1, ..., Bn-2, Bn-1) of a preselected length of n, n being a positive integer, a transition bit T and a dc balance bit D,
    said data bits B representing data words,
    said transition bit T indicating a bit inversion operation performed in response to the number of bits in said data bits and said transition bit of said block that are one of the binary states, and
    said dc balance bit D indicating a bit inversion operation performed in response to the dc balance of all the bits in said block with respect to a previously accumulated system balance;
    then updating an accumulated system balance by algebraically summing said dc balance of said block and said previously accumulated system balance;
    repeating the above steps for each of successive blocks; and
    serially transmitting each block successively.

10. The method of transmitting digital data signals in blocks, according to claim 9, comprising a further step of converting said data bits B and transition bit T into NRZI (Non-Return-to-Zero-Invert-on-One) form.

11. The method of serially transmitting digital data signals in blocks of coded bits according to claim 10, wherein said step of encoding comprises steps of:
    setting said transition bit T to binary zero and counting the number of binary ones in said data bits and said transition bit, to change said transition bit T to binary one if said number is larger than a preselected number; and
    calculating the dc balance of said block and generating said dc balance bit D according to said calculation result and said previously accumulated system balance.

12. The method of serially transmitting digital data signals in blocks of coded bits according to claim 11, further comprising steps of:
    adding to each block a frame bit F to form a frame, said frame bit F indicating a boundary of said frame and control of control functions in the data transmission;
    repeating the above steps for each of successive frames; and serially transmitting each frame successively.

13. The method of serially transmitting digital data signals in blocks of coded bits according to claim 12, wherein said step of adding a frame bit F comprises steps of:
    generating a plurality of frame bits in a pseudo-random pattern;
    generating control logic bits indicating said control functions; and
    replacing certain said frame bits with said logic control logic bits.

14. The method of serially transmitting digital data signals in blocks of coded bits according to claim 13, wherein said step of transmitting facilitates transmitting all the bits in each of successive frames in the following order in the time domain, said frame bit F, said dc balance bit D, said transition bit T and said data bits Bn-1, Bn-2, ..., B1, B0 in this order.

15. The method of serially transmitting digital data signals in blocks of coded bits according to claim 13, wherein said data bits are parallel data bits and said step of encoding is carried out in parallel.

16. The method of serially transmitting digital data signals in blocks of coded bits according to claim 14, wherein said data bits are serial data bits and said step of encoding is carried out in serial.

17. The high speed digital telecommunication system, according to claim 1, further comprising an apparatus for receiving said digital data signals, said apparatus for receiving comprising:
    decoder means for decoding in each block which includes said data bits B, said transition bit T and said dc balance bit D in accordance with the values of T and D.

18. The high speed digital telecommunication system, according to claim 17, said apparatus for receiving said digital data signals further comprising:
    framing circuit means for extracting said frame and control logic bits from said received digital data signals; and
    control means for initiating loopback functions in accordance with said control logic bits.

* * * * *